United States Patent [19]

Lejuste et al.

[11] Patent Number: 5,224,881
[45] Date of Patent: Jul. 6, 1993

[54] CONNECTION STRIP HAVING SEMI-INTEGRATED PROTECTORS

[75] Inventors: Maurice Lejuste, Vrigne Aux Bois; François Michaux, Sedan, both of France

[73] Assignee: Mars Actel, Vrigne Aux Bois, France

[21] Appl. No.: 818,902

[22] Filed: Jan. 10, 1992

[30] Foreign Application Priority Data

Jan. 10, 1991 [FR]  France .............................. 91 00231

[51] Int. Cl.⁵ .............................................. H01R 9/22
[52] U.S. Cl. .................................. 439/709; 439/922; 361/119
[58] Field of Search ............... 439/620, 709, 715, 716, 439/922; 361/119, 426

[56] References Cited

U.S. PATENT DOCUMENTS

| | | | |
|---|---|---|---|
| 4,449,156 | 5/1984 | Singer | 361/119 |
| 4,846,735 | 7/1989 | Teichler et al. | 439/709 |
| 4,851,967 | 7/1989 | Gerke et al. | 439/426 |
| 4,924,345 | 5/1990 | Siemon et al. | 439/620 X |
| 4,972,576 | 11/1990 | Sloppy et al. | 29/884 |

FOREIGN PATENT DOCUMENTS

| | | |
|---|---|---|
| 3813889 | 4/1989 | Fed. Rep. of Germany . |
| 9001687 | 4/1990 | Fed. Rep. of Germany . |
| 2048580 | 12/1980 | United Kingdom . |

*Primary Examiner*—Larry I. Schwartz
*Assistant Examiner*—Khiem Nguyen
*Attorney, Agent, or Firm*—Sughrue, Mion, Zinn, Macpeak & Seas

[57] ABSTRACT

The invention relates to a connection strip for transmission lines, having two rows of tags on a tag block for the pairs of conductors that define the lines, and having lightning arresters connected in parallel with the lines. The tag block has three rows of chimneys on its front face for the two rows of tags for the conductors, and a third row of tags for the lightning arresters, with the lightning arresters being mounted in a protection strip which is itself removably mounted on the third row of chimneys. The invention is applicable to telecommunications.

28 Claims, 12 Drawing Sheets

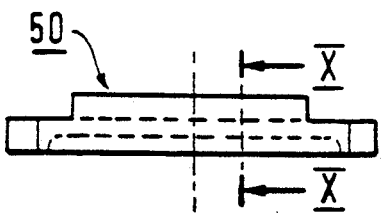
FIG. 9
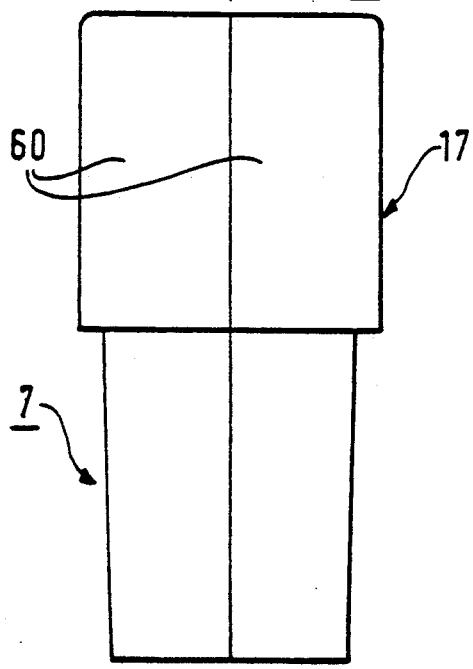
FIG. 10
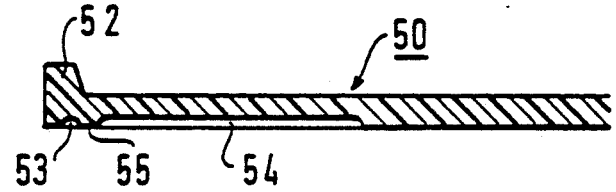
FIG. 11
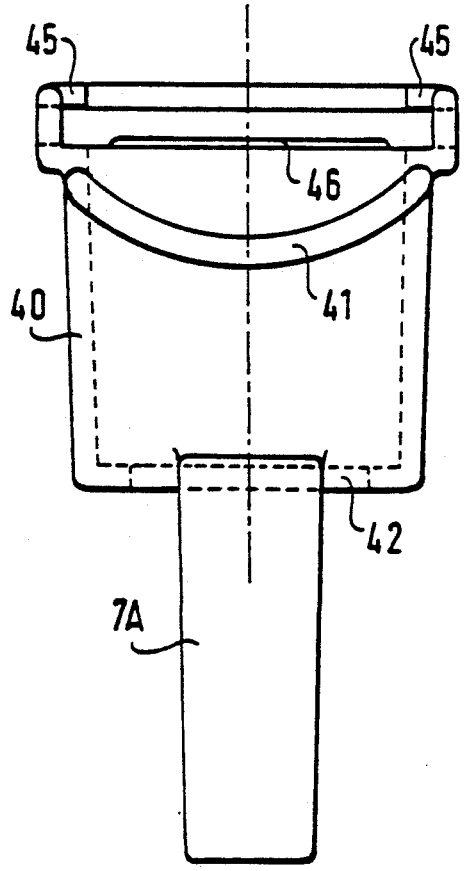
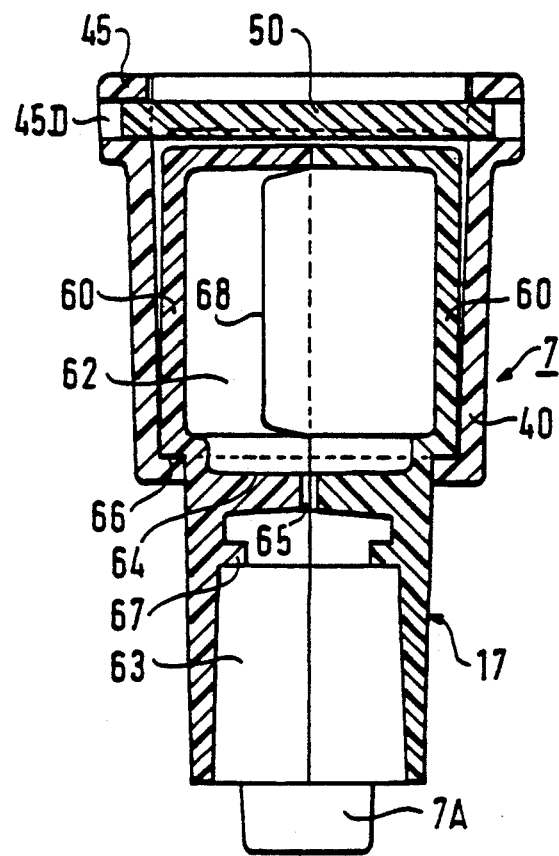

CONNECTION STRIP HAVING SEMI-INTEGRATED PROTECTORS

The present invention is applicable to the field of telecommunications. It relates to a connection strip for telephone lines.

BACKGROUND OF THE INVENTION

Such a strip is used to make connections, in particular between the pairs of conductors of a distribution cable and the pairs of conductors of subscriber lines. If necessary, it makes it possible to protect all or a portion of these connections against surge voltages from various possible origins, and in particular from lightning strikes or other phenomena.

Such connection strips are already known per se.

In particular, Document FR-A-2 526 592 describes a connection strip of this type. That strip comprises one or more identical "tag" blocks mounted on a support and a "protection" block associated with each tag block to be protected. The protection block is placed beside the corresponding tag block, extending along the length thereof.

In that known strip, the tag block has at least two rows of tags along its length. At least one of these rows is along its face facing the support, and at least one other row is along its opposite face. Means internal to the tag block interconnect corresponding tags in the rows.

In that known strip, the protection block includes a line of protectors such as lightning arresters. The lightning arresters are bipolar, each having one line tab or terminal and one ground tab or terminal.

The protection block has at least one row of tags which are connected to the line terminals of respective lightning arresters and are accessible for connection to tags in one of the rows of the tag block. The ground terminals of the lightning arresters are individually connected to a ground bar.

Connection means are provided between the protection block and the tag block. They comprise conductor wires connected to the tags of one of the rows in each of these blocks, or else U-shaped conductors connected to internal connection means in the tag block and to the line terminals in the protection block. The U-shaped conductors may themselves be mounted in a housing which is fitted on the support and which receives the tag block and the protection block.

The resulting strip is relatively complex, and above all it presents difficulties in use, without providing connections of sufficient reliability.

An object of the present invention is thus to enable incoming and outgoing conductors to be distinguished, advantageously with all of the connection points both for said conductors and for their protectors being disposed on a single "front" face to make the strip easier to work with, and also to enable more reliable connections to be obtained.

Another object of the invention is to make better protection possible, preferably by using three-pole protectors or lightning arresters.

SUMMARY OF THE INVENTION

The present invention provides a connection strip having semi-integrated protectors for transmission lines defined by pairs of incoming conductors connected to pairs of outgoing conductors, the strip comprising:

a tag block;

first and second rows of tags mounted in said tag block and attributed to said incoming conductors and to said outgoing conductors, depending on the row under consideration, with corresponding tags in said first and second rows being connected to each other inside said tag block and being accessible from a "front" face of said tag block;

a protection strip fitted to the front face of the tag block and carrying individual protectors for said lines, referred to as "lightning arresters";

a third row of tags mounted in said tag block being attributed to connecting the lightning arresters in parallel with said lines, with at least some of the tags of said third row being individually connected within the tag block to corresponding tags of said first and second rows and being accessible from said front face of the tag block; and a fourth row of tags accessible on a "back" face of said protection strip and individually connected in said protection strip at least to the "line" electrodes of the lightning arresters, the tags of said fourth row connecting directly to the tags of said third row;

wherein said third and fourth rows both include ground tags, with the ground tags of said fourth row being connected to "ground" electrodes of respective individual lightning arresters within said protection strip, and the ground tags of said third row being additionally mounted to project from the back face opposite to said front face of said tag block and being connected to back means for distributing a common ground.

The present invention preferably further presents the following features taken individually or in combination:

the said protection strip includes a charger of substantially the same length as the said tag block as measured along said rows, with said lightning arresters being mounted and retained in the charger, with the charger preferably receiving lightning arresters only for those lines that are to be protected;

the lightning arresters are held in place by a sliding lid for the compartmentalized charger, said lid advantageously having its stroke limited to the stroke which is required for opening and closing the charger;

the lightning arresters are mounted individually in sealed boxes divided into two compartments, with only their contact tabs being accessible in one of the compartments;

the lightning arresters are three-pole arresters;

the tag block has three rows of projecting chimneys on its front face in correspondence with said first, second, and third rows of tags, with individual tags being housed in respective chimneys; and the block further has two additional end chimneys at the end of the third row of chimneys for mounting and holding the protection strip.

BRIEF DESCRIPTION OF THE DRAWINGS

Embodiments of the invention are described by way of example with reference to the accompanying drawings, in which:

FIG. 9 is a diagrammatic exploded elevation view of a protection strip of the connection strip of FIG. 1;

FIG. 10 is a section view through closure means for the protection strip of FIG. 9 and referred to as a "lid";

FIG. 11 is a cross-sectional view of the protection strip;

DETAILED DESCRIPTION

Figure 1:
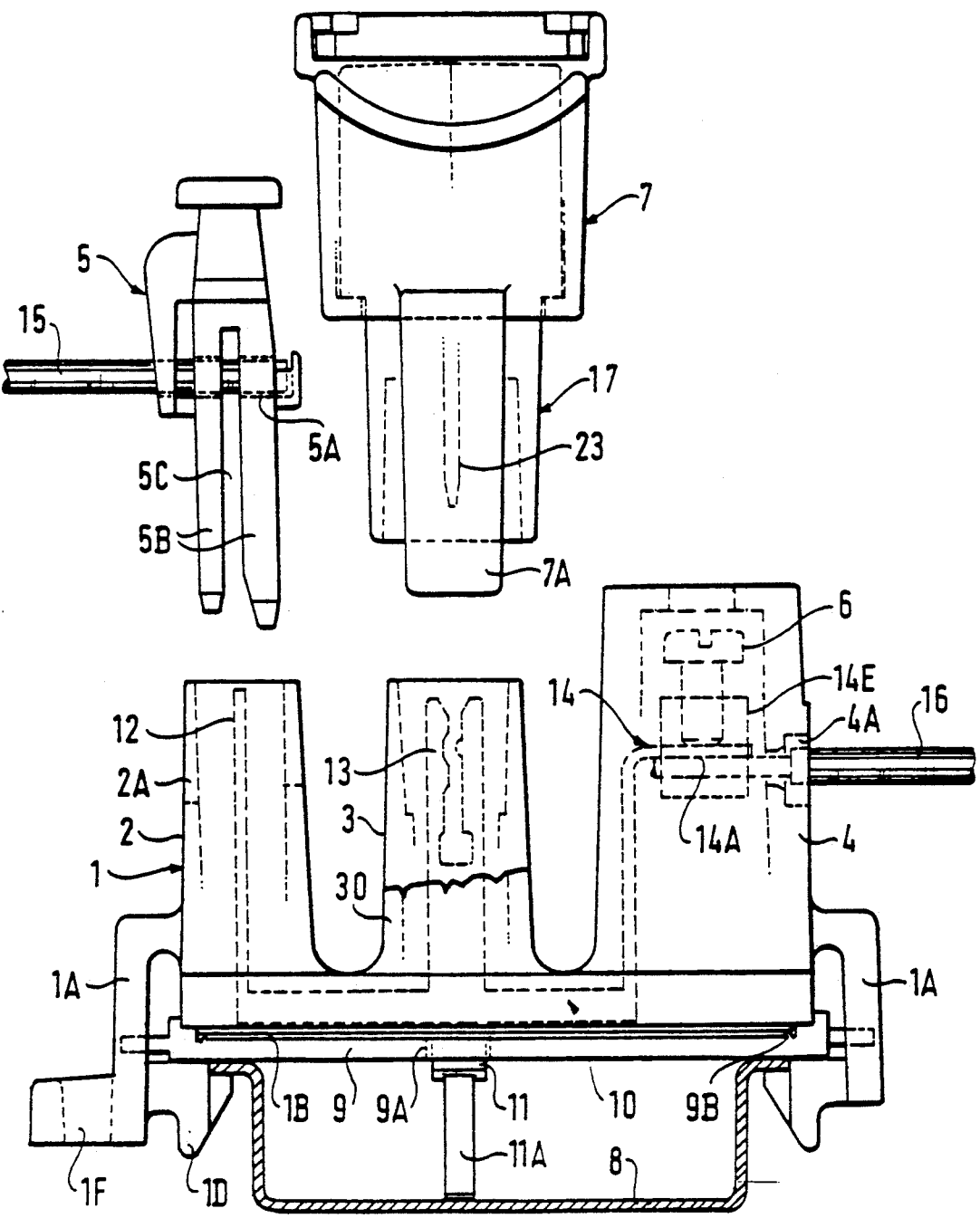
FIG. 1 is a diagrammatic exploded elevation view of a preferred embodiment of the connection strip of the invention.

With reference to FIG. 1, it can be seen that a connection strip of the invention essentially comprises:

"tag" block 1 having three longitudinal rows of individual chimneys 2, 3, and 4 on a "front" one of its faces, each chimney housing a respective tag 12, 13, and 14 with the two outer rows 2 and 4 being for making connections with the incoming and the outgoing conductors respectively, while the middle row 3 is for providing protection to the resulting lines;

connection means 5 for connecting individual "incoming" conductors 15 to the tags 12 in the chimneys 2;

connection means 6 for connecting individual "outgoing" conductors 16 to the tags 14 of the chimneys 4; and a protection strip 7 associated with the middle row of chimneys 3 and in which individual protectors referred to as "lightning arresters" (not shown but designated below by the reference 20) are mounted for those lines or pairs of interconnected incoming and outgoing conductors that are to be protected.

The lightning arresters are mounted in individual boxes 17. Advantageously, the arresters are of the three-pole type with only one of two line tabs 23 being visible, which tabs are disposed on either side of a middle ground tab designated below under reference 21, said tabs being aligned in a row on the back of the protection strip.

The tag block 1 is mounted on a metal or metal-plated support such as a support rail 8. To this end, it has lateral fixing arms 1A projecting from its rear face for fastening it on the rail. A backplate 9 for retaining the tags is a separate component that is held in abutment against the lateral fixing arms 1A and is fixed in sealed manner by ultrasound on the back face of the tag block. V-shaped ribs 1B or 9B or "energy directors" are provided on the back face of the block and/or on said plate to concentrate energy for fixing purposes.

Corresponding tags 12 and 14 in their respective rows are directly interconnected and they are also connected to a tag 13. They all belong to a single tag component 10, with the tag 13 being received in the corresponding divided or compartmentalized chimney 3 as described below.

Another tag 11 having a connection tail 11A projecting from the back of the tag block 1 is housed in a middle portion of each of the chimneys 3. This tag is independent from the tag component 10. Its connection tail 11A passes through a window 9A in the backplate 9 and makes contact with the rail 8. The tag 11 is referred to as a "ground" tag.

The tag block 1 fitted in this way with connection means 5 and 6 and with the protection strip 7 constitutes a unit module for making up a connection assembly.

In FIG. 1, the chimneys 2 and 4 are shown as being slightly different and as being equipped differently. As a result the connection means 5 and 6 are correspondingly of two different types.

In the example shown, the tag 12 is an insulation displacement tag whereas tag 14 is a screw terminal tag having a resilient tag 14A that constitutes a part of the tag component 10 and which is received in a clamp 14E mounted in the chimney. The tab 14A is driven by the connection means 6 constituted by a screw. The tag or connection terminal 14 receives the stripped end of conductor 16 via an inlet hole 4A to the terminal 14 provided in the outside wall of each of the chimneys 4 in the connection strip.

The connection means 5 are constituted by respective pushers, one for each chimney 2, or in a variant by double pushers for use with a pair of chimneys 2, the pushers serving to insert and connect conductor 15 without prior stripping. A pusher 5 has a hole 5A for receiving and holding a non-stripped conductor that is to be connected, and it is provided with two legs 5B leaving a gap 5C between them.

The legs guide the pusher inside the chimney 2 on either side of the insulation-displacement tag 12 that is received in the gap 5C until a connection is obtained between the conductor 15 and the insulation displacement tag 12. A slot 2A in the outside wall of the chimney 2 and another slot in the opposite wall thereof are provided for the pusher that is equipped as shown but they are not described in detail since they lie outside the scope of the present invention.

Naturally the connection strip could have its chimneys 2 and 4 identical to one another constituting two outer rows that would then be entirely symmetrical. The connection means such as 5 and 6 would then be identical to one another.

Figure 2:
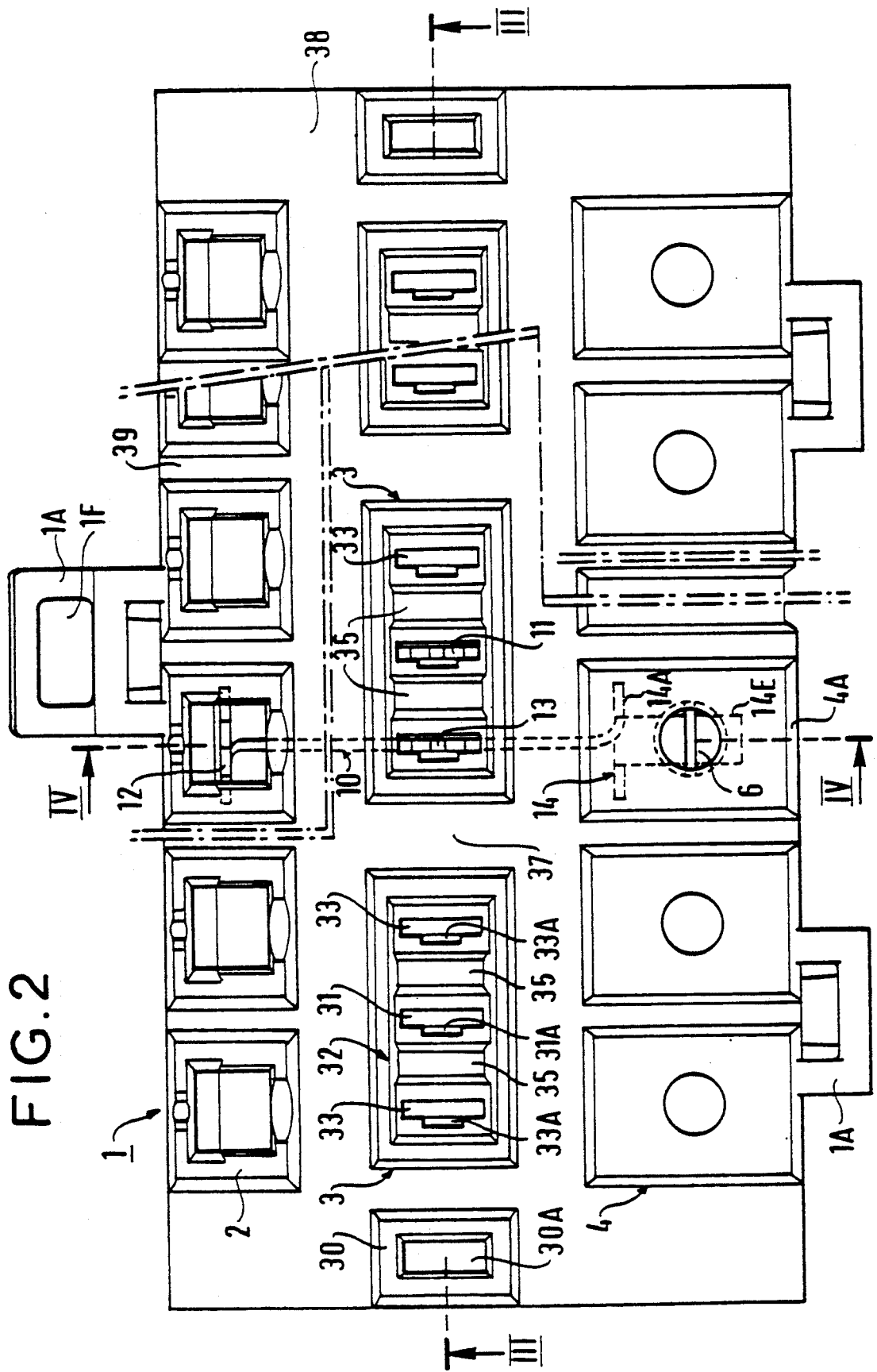
FIG. 2 is a plan view of a "tag" block of the FIG. 1 strip.

The way in which the protection strip 7 is mounted on the middle row of chimneys 3 is described with reference to FIG. 1 and to FIGS. 2 and 3.

The protection strip 7 is removable from the tag block 1, as can be seen from the way it is shown in FIG. 1. On its small end faces, it has two respective end tabs 7A that project a considerable distance beyond its back face for the purpose of centering it and mounting it on the tag block.

The tag block has two additional end chimneys 30 for receiving the tabs 7A. These two end chimneys 30 are at opposite ends of the middle row of chimneys 3.

They have relatively narrow inside channels 30A opening out into the larger openings 30B in the back face of the tag block for optional resilient fastening of the corresponding tabs 7A. The protection strip is also mounted and held in place by dispositions provided on the box 17 for each of the lightning arresters, as described below.

For mounting the tag block 1 on its rail 8, it may be observed that the tag block 1 is merely fitted on one side with two snap-fastening lateral arms 1A and on its opposite side with a single identical snap-fastening arm 1A.

At least one of these arms has a window 1F in an outwardly projecting side projection. In addition, each of the arms has an inwardly directed and backwardly projecting catch ID for snap-fastening and retaining the tag block on the rail. The above-mentioned window(s) 1F is/are used for detaching the block from the rail by engaging an external lever therein.

The arrangement of the chimneys 3 in the middle row relative to the chimneys 2 and 4 in the outer rows is described with reference to FIGS. 2 to 4.

Each of the chimneys 3 corresponds to two chimneys 2 and to two chimneys 4 for use in connecting a single telephone line, and each of the chimneys 3 serves to make it possible to protect said line, should that be desired. As shown in one of the chimneys 3 only, seen in different figures as being partially or fully equipped with its tags, each of the chimneys 3 receives two tags 13 and a ground tag 11, the ground tag 11 being mounted between the other two tags and being insulated therefrom.

The chimneys 3 are internally compartmentalized over a portion of their height so as to present three distinct and parallel channels and are disposed side by side in alignment in the row direction of the chimneys 3, with the middle channel being referenced 31 and with the two outer channels being referenced 33. These three channels open out to the back face of the tag block 1 and to a common opening 32 in its front face. The overall section of each channel is rectangular, with the long axis of the rectangle extending transversely to the row of chimneys 3 and to the other rows of chimneys 2 and 4.

Each of the outer channels 33 is level with a corresponding chimney 2 and a corresponding chimney 4, whereas the middle channel 31 is level with the gap between the two chimneys 2 and the two chimneys 4 that correspond to each chimney 3.

The two tags 13 are held in the channels 33 and the ground tag 11 is held in the channel 31, with their terminal portions projecting into the common opening 32. Notches 35 in the partitions 36 between the channels 31 and 33 establish long creepage distances between the channels. Respective notches, referenced 33A or 31A as the case may be, extend over a fraction of the height of one of the walls of each of these channels, open out into the opening 32, and form opposite thereto a retaining abutment for the tag mounted in the channel. The abutment is designated by the same reference as the notch defining it.

Figure 3:
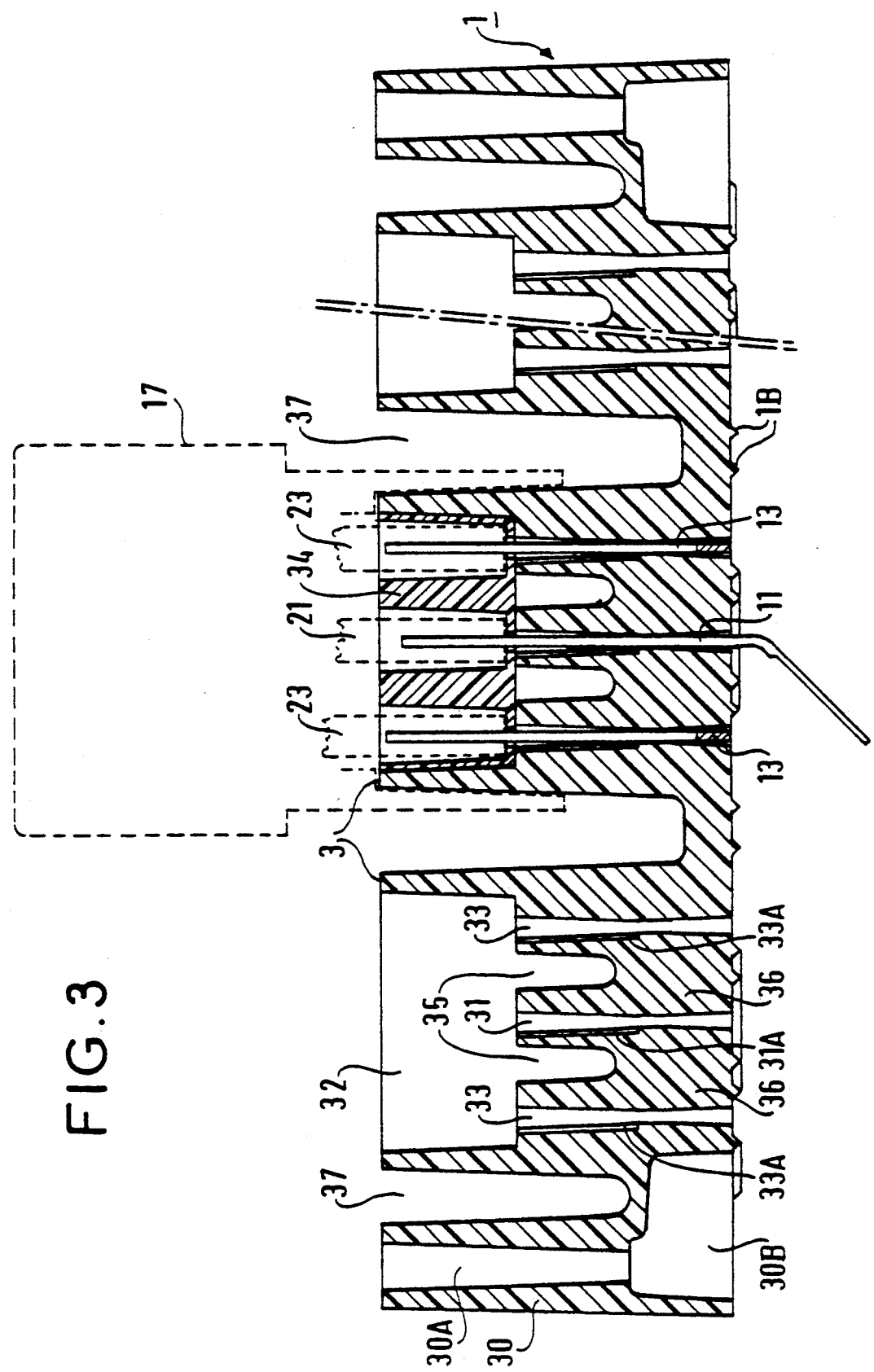
FIG. 3 is a longitudinal section view through the tag block on arrows III—III of FIG. 2.

The common opening 32 also preferably receives a plastic cap 34 for sealing and insulation purposes, and as shown in FIG. 3 for the only chimney 3 fitted therewith, said cap has cells and overlies the end portions of the tags 13 and 11 while allowing them to be connected to the line tabs 21 and to the ground tab 23 of a corresponding lightning arresters. In a variant, the opening may be filled with an insulating grease or the like.

The chimneys 3 are separated from one another and also from the two end chimneys 30 by deep notches 37 in the front face of the tag block. Two deep longitudinal grooves 38 run along either side of the row of chimneys 3 to separate it from the rows of chimneys 2 and 4.

Each of the chimneys 2 and 4 has a single non-referenced channel which is merely shaped to retain the tag that is mounted therein. They are therefore not described in greater detail. They are separated from one another by notches 39 in the front face which, like the notches 37 between the chimneys 3, open out into the longitudinal grooves 38.

With reference to FIG. 3, it can be seen that the two tags 13 and the ground tag 11 in each chimney 3 engage two line tabs 23 and a ground tab 21 projecting from the back of the protection strip 7 installed on the tag block 1.

Figure 4:
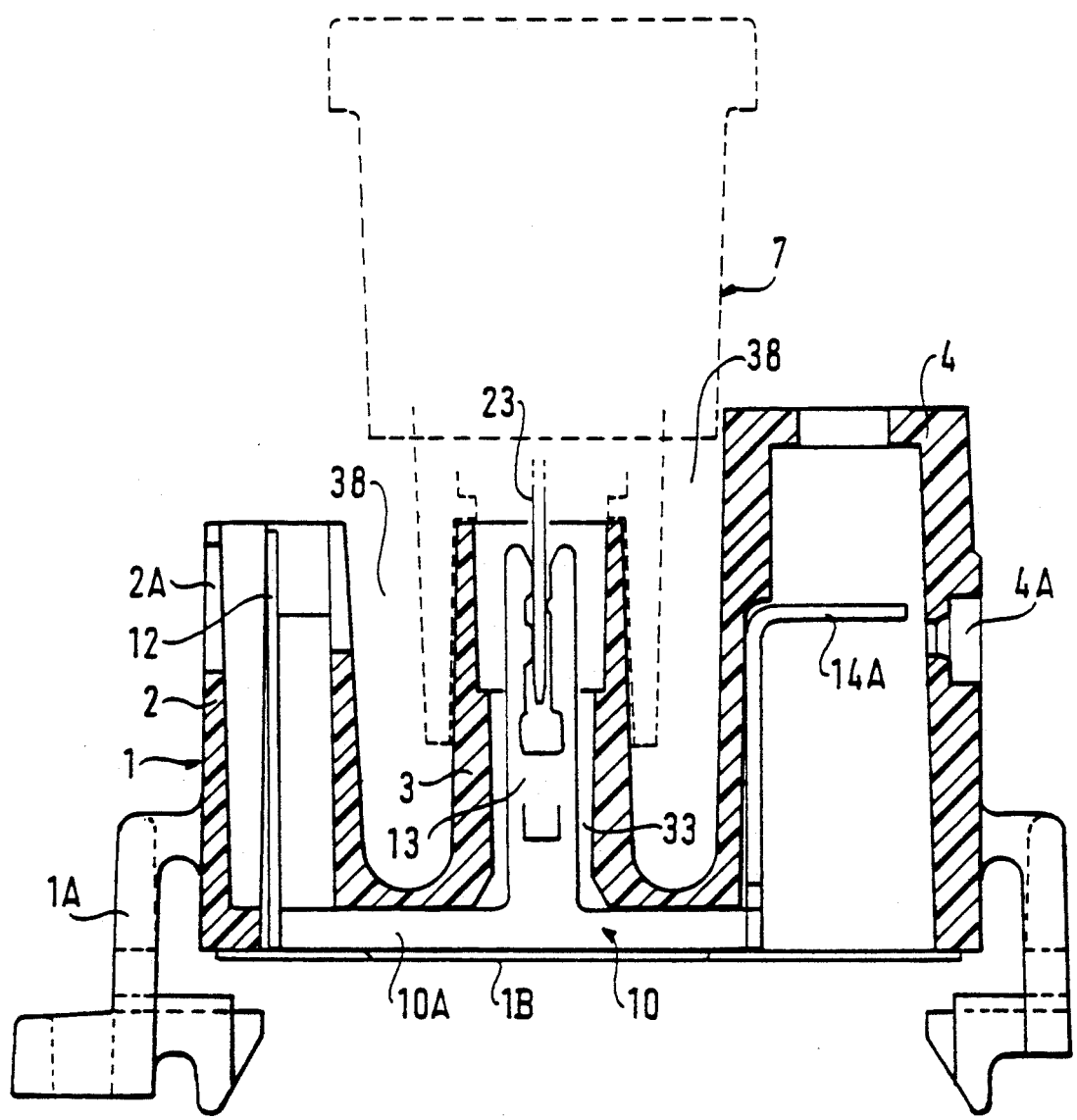
FIG. 4 is a cross-section view through the tag block on arrows IV—IV of FIG. 2.

With reference to FIG. 4, it can clearly be seen that the tag 12 in a chimney 2, the portion 14A of the tag 14 in the corresponding chimney 4, and the tag 13 in one of the channels 33 of the corresponding chimney 3 all belong to the same tag component 10. The tag component 10 constitutes a connecting bridge 10A between them. This connecting bridge extends along the width of the tag block, over its back face. It is received in and held in the back face of the tag block and it is retained and protected by the above-mentioned retaining backplate.

Figure 5:
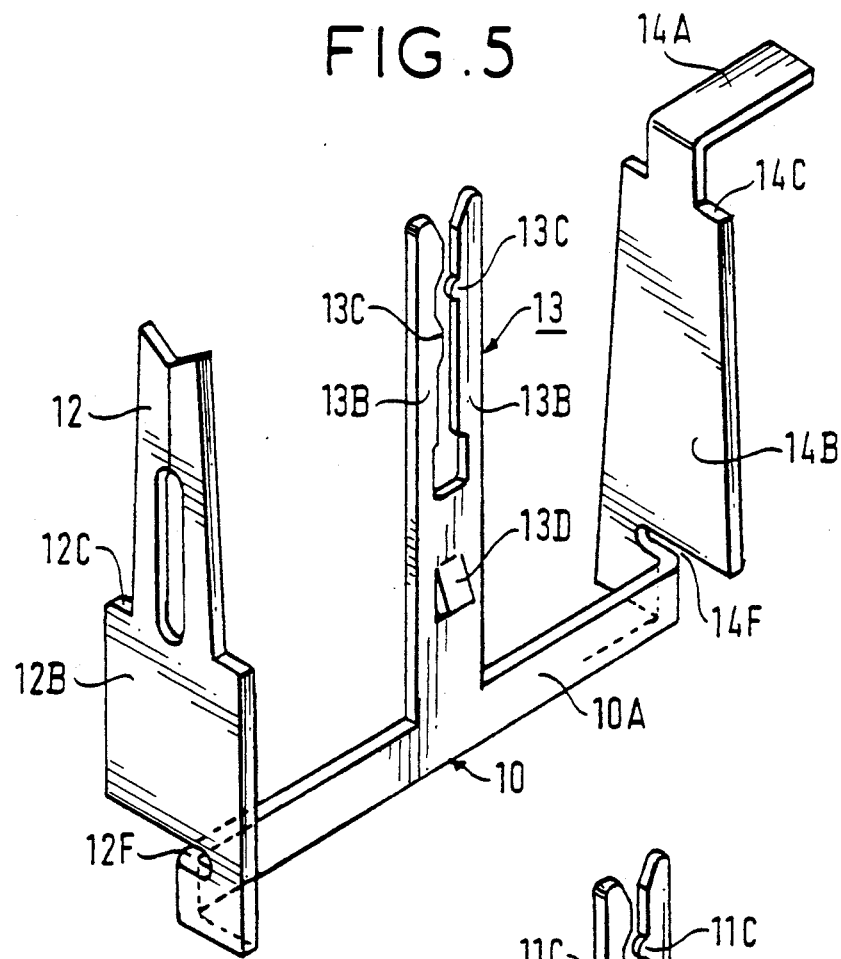
FIGS. 5 and 6 show two tag components of the tag block of FIGS. 2 to 4.
Figure 6:
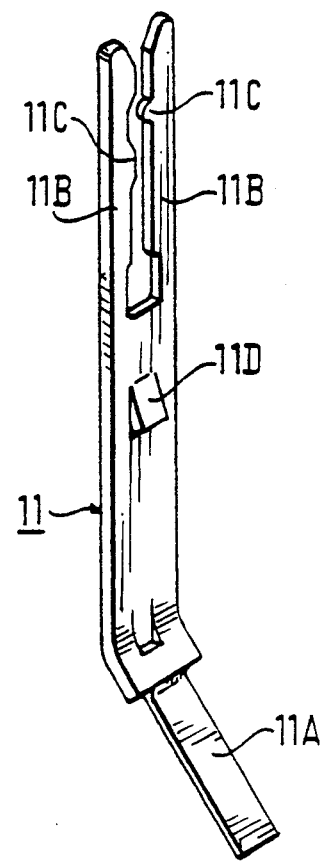

FIG. 5 shows the tag component 10 and FIG. 6 shows the ground tag 11. The tags 12 and 14A on the tag component 10 correspond to different types of chimney 2 and 4. They are formed on respective legs 12B and 14B of the tag component 10, which legs are parallel and folded in opposite directions at respective ends of the connecting bridge 10A. The legs are wider than the bridge and each of them leaves a notch 12F or 14F between itself and the bridge. The insulation displacement tag 12 forms the end portion of the leg 12B. It is of the type having a single fork. The leg 12B has two lateral shoulders 12C for retaining it against the walls of one or other of the chimneys 2.

The tag 14A is a resilient tab folded at the end of the leg 14B. The leg 14B likewise has two lateral shoulders 14C for retaining it in one or other of the chimneys 4.

The tag 13 lies in the plane of the connecting bridge 10A and projects in an upsidedown T-shape therefrom. Like the ground tag 11 described simultaneously therewith, it includes a lengthwise slit so as to present two resilient branches 13B or 11B depending on the tag under consideration. Each of these branches has an inwardly directed bulge 13C or 11C that projects into the slit. The two bulges 13C or 11C are slightly offset from each other along the slit of the tag under consideration, and they serve to make it easy to insert the line tab 23 or the ground tab 21 of the lightning arrester and to make good electrical contact therewith (FIG. 4). A tongue 13D or 11D punched out of each tag 13 or 11 serves to retain it against the bottom of the lateral notch in the corresponding channel 33 or 31 of each chimney 3 (FIG. 3).

Whereas the tag 13 belongs to tag component 10, the ground tag 11 is independent. As shown in FIG. 1, the resilient connection tail 11A that extends it and that is folded a small amount relative thereto passes through one of the corresponding windows 9A in the retaining backplate to engage in rubbing contact against the rail.

Figure 7:
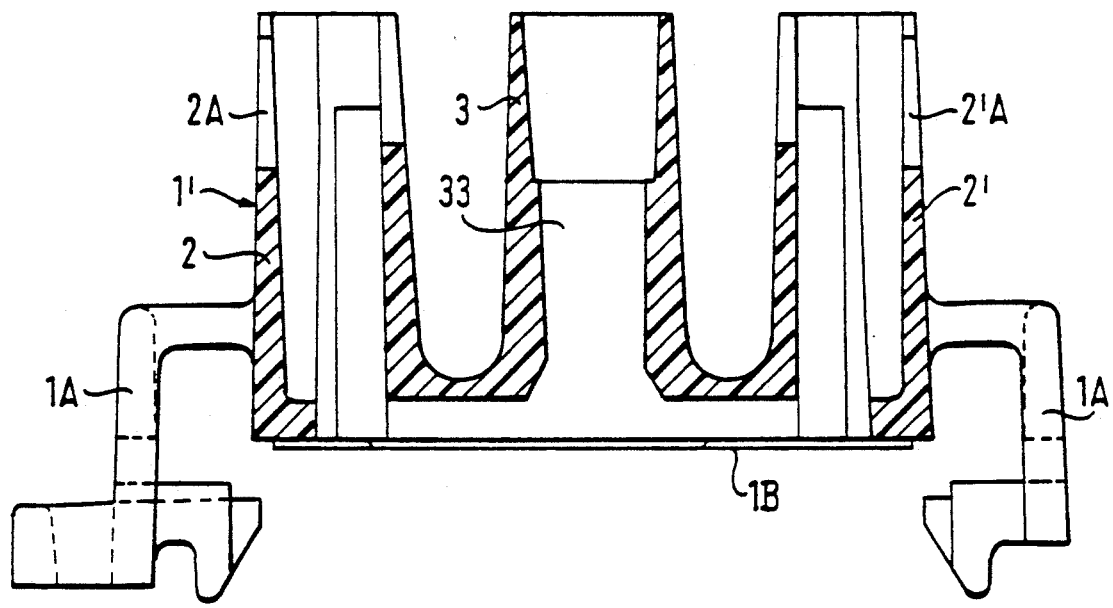
FIG. 7 is a cross-section through a tag block constituting a variant embodiment.
Figure 8:
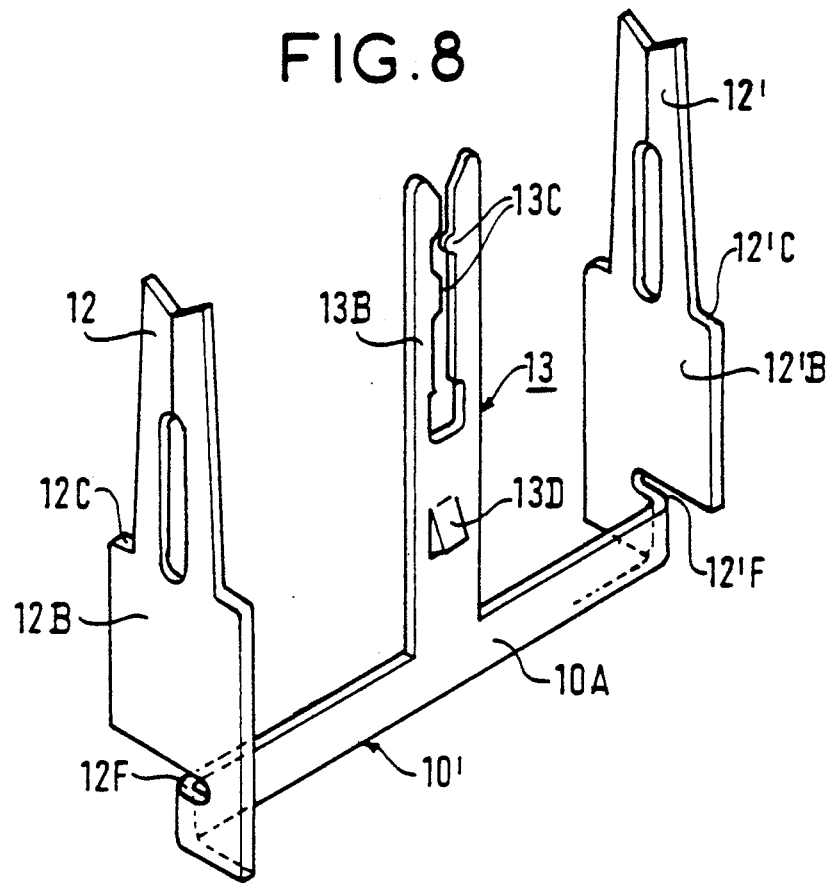
FIG. 8 shows a modified tag component for the tag block of FIG. 7.
Figure 12:
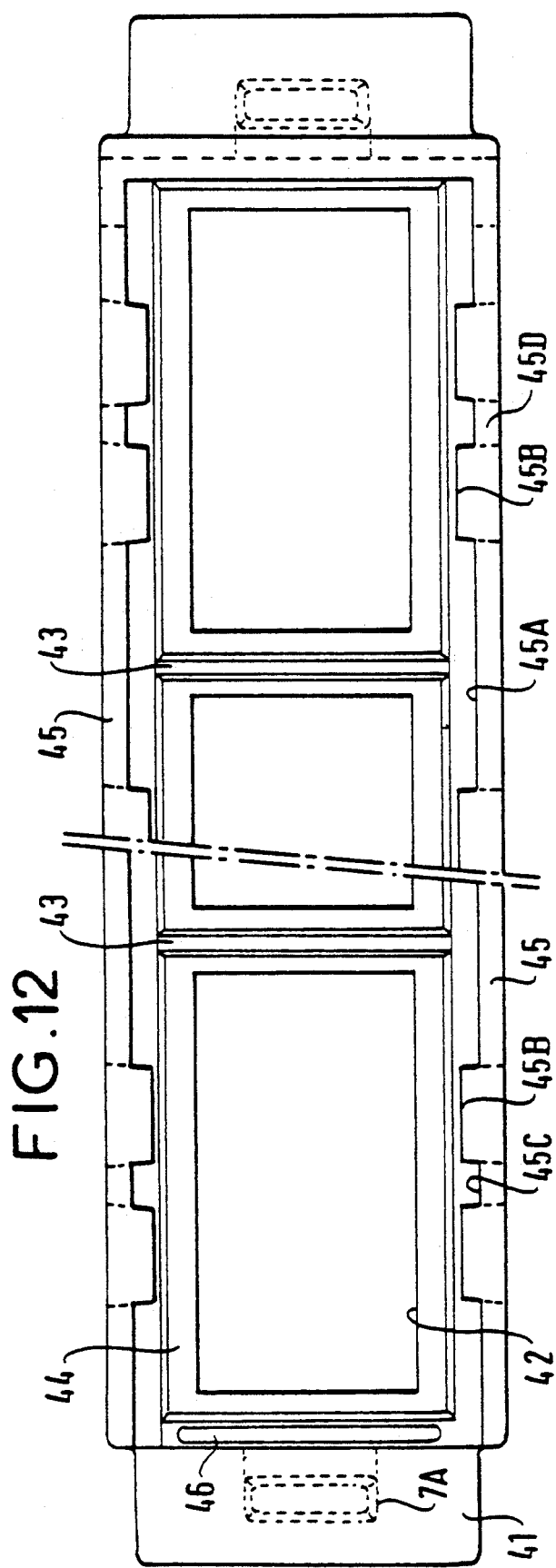
FIGS. 12 and 13 are two plan views of a charger and of the lid of the FIG. 9 protection strip.
Figure 13:
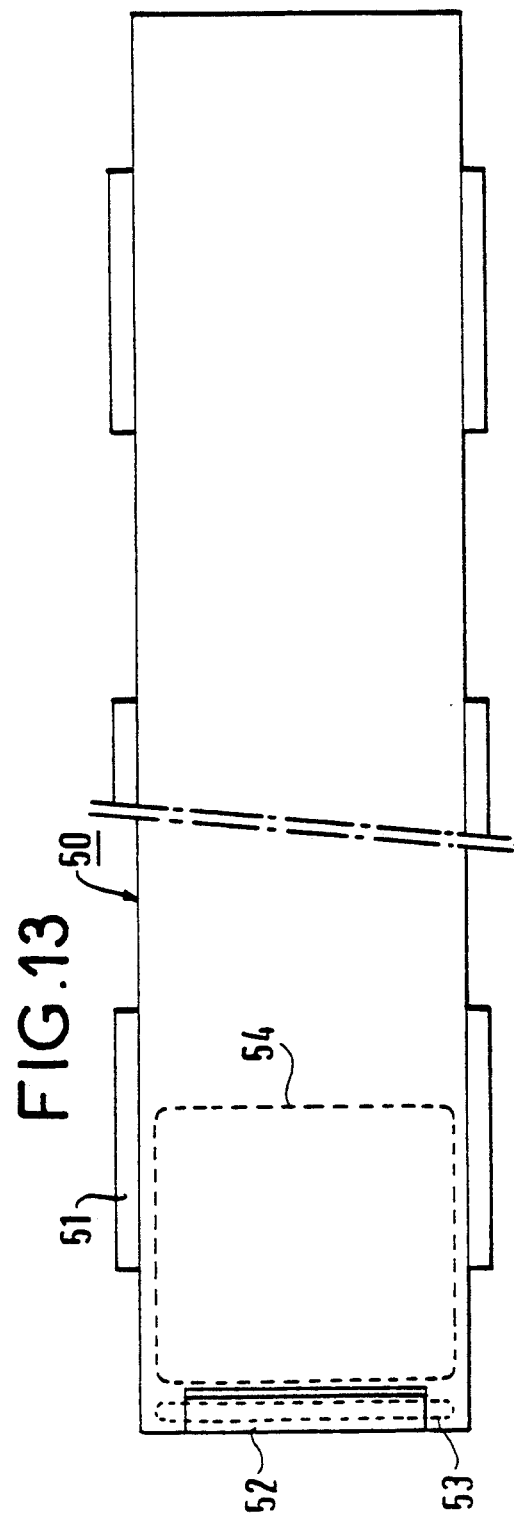
Figure 14:
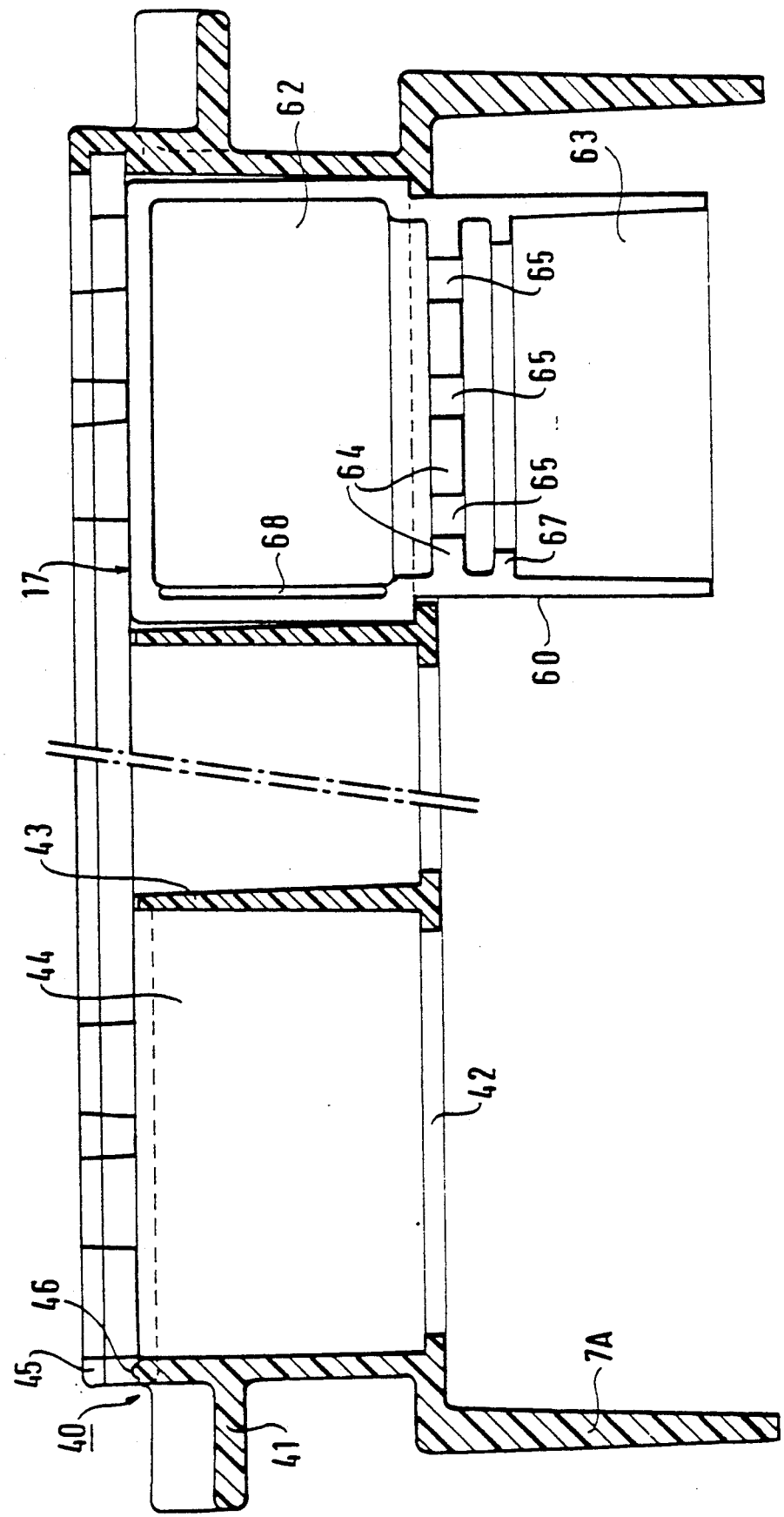
FIG. 14 is a longitudinal section view of said protection strip.

FIG. 7 shows a tag block 1' whose two outer rows of chimneys are identical to the above chimneys 2, and they are referenced 2 and 2'; FIG. 8 shows a tag component referenced 10' which is modified accordingly, and in which the two end tags 12 and 12' are identical for the chimneys 2 and 2' while the tag 13 for the chimney 3, or more precisely for one of its channels 33, remains unchanged. In FIGS. 7 and 8, items bearing the same reference numerals, with or without the "prime" symbol, are identical to one another and to the items having the same references in FIGS. 4 and 5.

Above-mentioned protection strip 7 is described below with reference to FIGS. 9 to 15.

The strip comprises a charger 40 of length corresponding to the length of the tag block, the boxes 17 for each of the internal lightning arresters, and retaining means 50 forming a lid on the charger. The boxes 17 are mounted independently from one another inside the charger.

The charger 40 is generally of channel section. Its two end faces are closed. The tabs 7A for assembling the protection strip on the tag block are formed integrally therewith. In addition, on its two end faces, the charger has two grasping handles 41 for mounting it on the tag block and for removing it therefrom.

The bottom web of the charger has a row of windows 42 corresponding to the middle row of chimneys in the tag block, and it is compartmentalized lengthwise by transverse partitions 43. It thus has as many compartments 44 as there are chimneys 3, each compartment having an open bottom 42 in the bottom thereof.

The two longitudinal edges of the front opening of the charger project a little outwardly over the two large faces of the charger and are folded back towards each other to facing the inside of the opening. They form a pair of channel-section slideways 45 for the lid 50. These slideways are open at the end faces of the charger.

Advantageously, the top branch of each of the slideways 45 is crenelated and has alternating notches 45A and teeth 45B. Each tooth 45B is also shown split in two by a small notch 45C passing through the middle thereof and centered on the corresponding compartment 44. Each notch 45C corresponds to a small window 45D through the web of each slideway.

A rib 46 of semicircular section is provided on the edge of one of the end faces of the charger. The rib serves to hold the lid 50 in place on the charger 40.

The lid 50 (FIGS. 10, 13) is constituted by a single plate that slides along the charger. It has teeth 51 that are spaced apart from one another along its two side edges for guiding the lid along the slideways 45. The teeth 51 serve to retain the lid beneath the teeth 45B of the slideways 45, but they enable the lid to be withdrawn via the notches 45A by sliding the lid over a very short stroke, and not along the total length of the charger.

To drive it along the slideways 45, one of the ends of the lid is made of greater thickness and forms an end pull-tab 52 projecting from its outside face. It has a semicircular groove 53 in its inside face beneath the pull-tab.

This groove 53 receives the rib 46 on the charger to hold the lid in the closed position on the charger.

There is also a dent 54 in the inside face of the lid. This dent is close to the groove 53. The dent 54 receives the rib 46 of the charger while the lid is sliding which continues to maintain the boxes 17 inside the charger so long as the lid is not removed. The dent corresponds to the lid being moved along a stroke of length close to one-half the length of a compartment 44, after which it is possible to remove the lid. It allows a narrow bulge 55 to pass between itself and the groove 53 to impede undesired opening of the lid.

A box 17 receives a lightning arrester 20 for connection in parallel on a line to be protected. The box is received in a corresponding compartment 44 of the charger and it contributes to guiding and assembling the protection strip on the tag block.

Each of the boxes 17 is constituted by two identical half-shells 60 mounted face to face and assembled against each other. The two half-shells enclose the lightning arrester between them and protect its line tabs 23 and its ground tab 21.

Each half-shell 60 (FIGS. 11, 14, and 15) is divided into two portions 62 and 63 by an inside separator web or rib 64. The "front" portion 62 of the two half-shells when assembled together defines a housing for the lightning arrester, while the "back" portion thereof 63 houses the contact tabs of the arrester. The front housing 62 is completely closed apart from the three slots 65 providing it with communication with the back housing 63.

The back housing 63 is open to the back face of the box and constitutes a chimney for the three contact tabs of the lightning arrester. The back portion of the box is thus referred to as a "chimney".

The three slots 65 are formed in the edges of the webs 64 of both half-shells and they are relatively shallow. They receive and hold the three contact tabs which project a considerable distance into the chimney 63.

The box 17 for each of its two half-shells 60 has an external shoulder 66 substantially between the walls of the housing 62 and the walls of the chimney 63, to define an abutment for the box on the bottom of one of the compartments 44 in the charger. The chimney 63 projects through the back of the charger via the window 42 in the bottom thereof. An inside shoulder 67 in the chimney 63 is provided in the vicinity of the web 64. It constitutes an abutment for the end of the chimney 3 that receives a protector, the chimney 63 engaging on the periphery of the chimney 3 with its internal contact tabs then connecting to the tags inside the chimney 3.

The way two half-shells 60 are assembled together to form a box enclosing the lightning arrester is described with reference to FIG. 15. Advantageously, a projecting flap 68 is provided on one of the edges of the opening in the housing 62 of each half-shell 60, said lip extending the inside face of said wall. The lip engages against the inside face of the opposite wall of the other half-shell which is assembled to the half-shell under consideration. In addition, the half-periphery of the opening of each half-shell that does not include the lip 68 and on the adjacent half of the web 64, a narrow V-shaped rib 69 is provided that bears against the rib-free half-periphery of the other half-shell assembled therewith, thus facilitating welding, e.g. ultrasonic welding.

Figure 15:
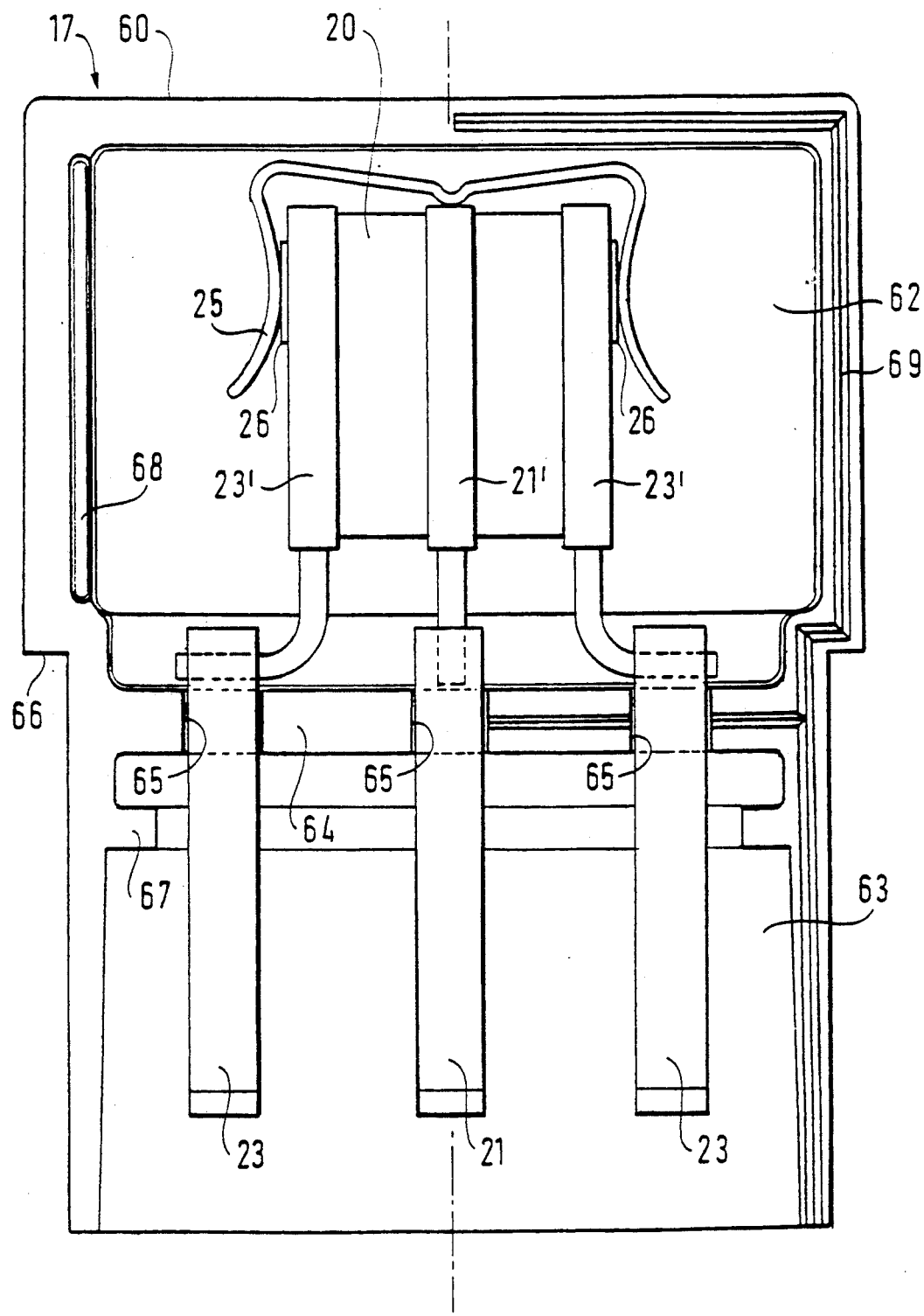
FIG. 15 is a view of a half-shell of a box for assembling protectors in the charger or strip of FIGS. 9 and 11.

FIG. 15 also shows the lightning arrester 20 mounted inside one of the half-shells 60 of the box prior to the box being closed. The arrester is preferably chosen to be of the three-pole type and is known per se. The figure merely shows its two line tabs 23 and its ground tab 21 connected to its three corresponding electrodes 23' and 21'. A short circuit ring 25 is internally mounted on these three electrodes. The ring 25 is in direct contact with the ground electrode 21'. In contrast, it is insulated from both of the line electrodes 23' by means of fusible pellets 26. Above a pre-established surge voltage on the corresponding line defined by the pair of inlet conductors and the pair of outlet conductors connected to the tag block, the pellets 26 melt and cease to insulate the ring 25 from the line electrodes and tabs, thereby affording protection to the line by connecting it to earth. Naturally, the lightning arrester may include other equivalent arrangements for ensuring the line protection function that it provides.

Figure 16:
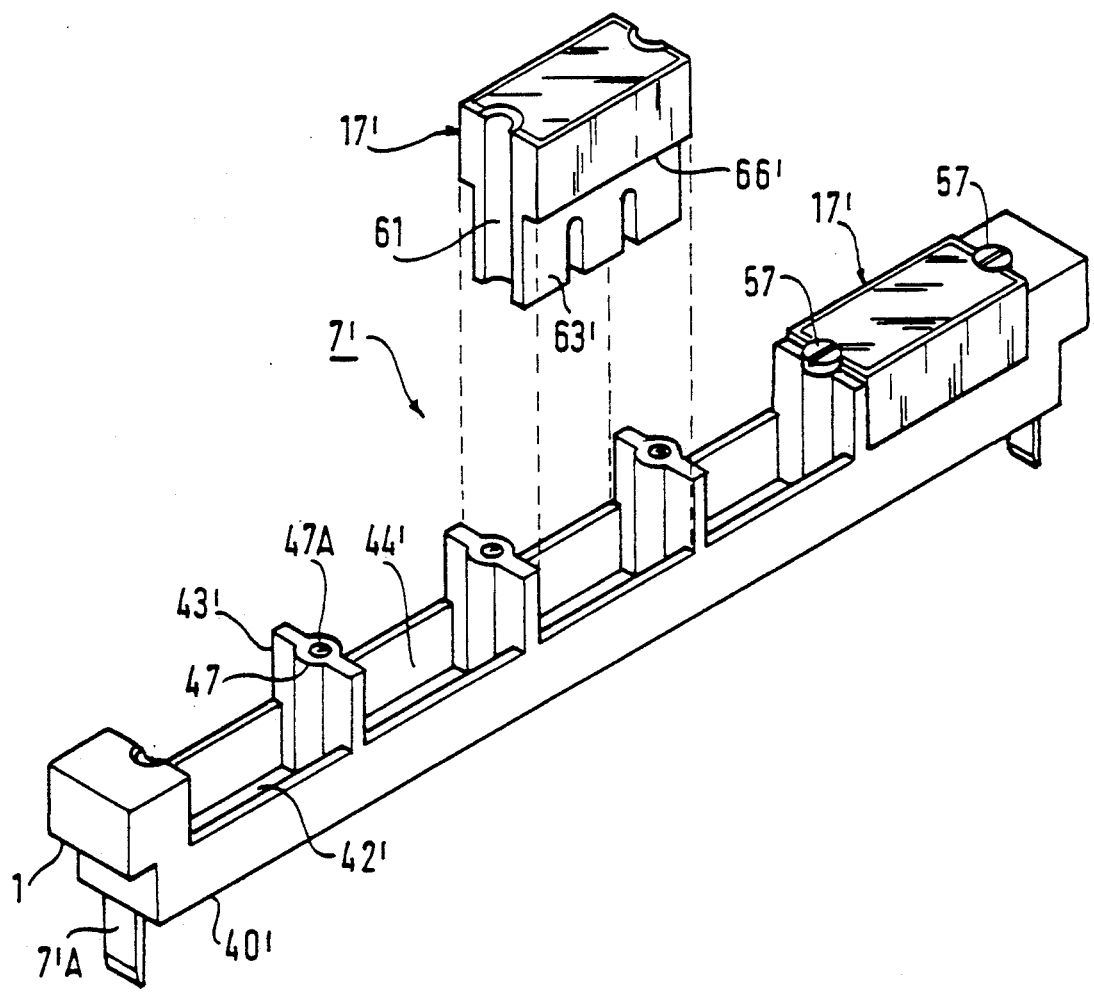
FIG. 16 is a diagrammatic view of a variant embodiment of the above protection strip.

Highly diagrammatic FIG. 16 shows a variant embodiment of the above-described protection strip. The strip in this variant is given overall reference 7'.

This protection strip 7' comrpises a charger 40' receiving one or more boxes 17' each containing its own lightning arrester (not shown) that is analogous to the above-described lightning arrester.

Only the main differences of the charger 40' and the box 17' relative to the above-described charger 7 and box 17 are now described, while comparable portions that are unchanged or adapted are designated in FIG. 16 by the same numerical references plus the "prime" symbol.

The transverse partitions 43' between the compartments 44' along the charger 40' and the two end faces of the charger project a considerable distance from its longitudinally extending long faces. In addition, the windows 42' in the bottoms of the compartment occupy the bottoms fully. The transverse partitions 43' have central swellings forming circular ribs 47 extending up their entire height, and have respective cylindrical bores 47A that receive quarter-turn screws 57.

Figure 17:
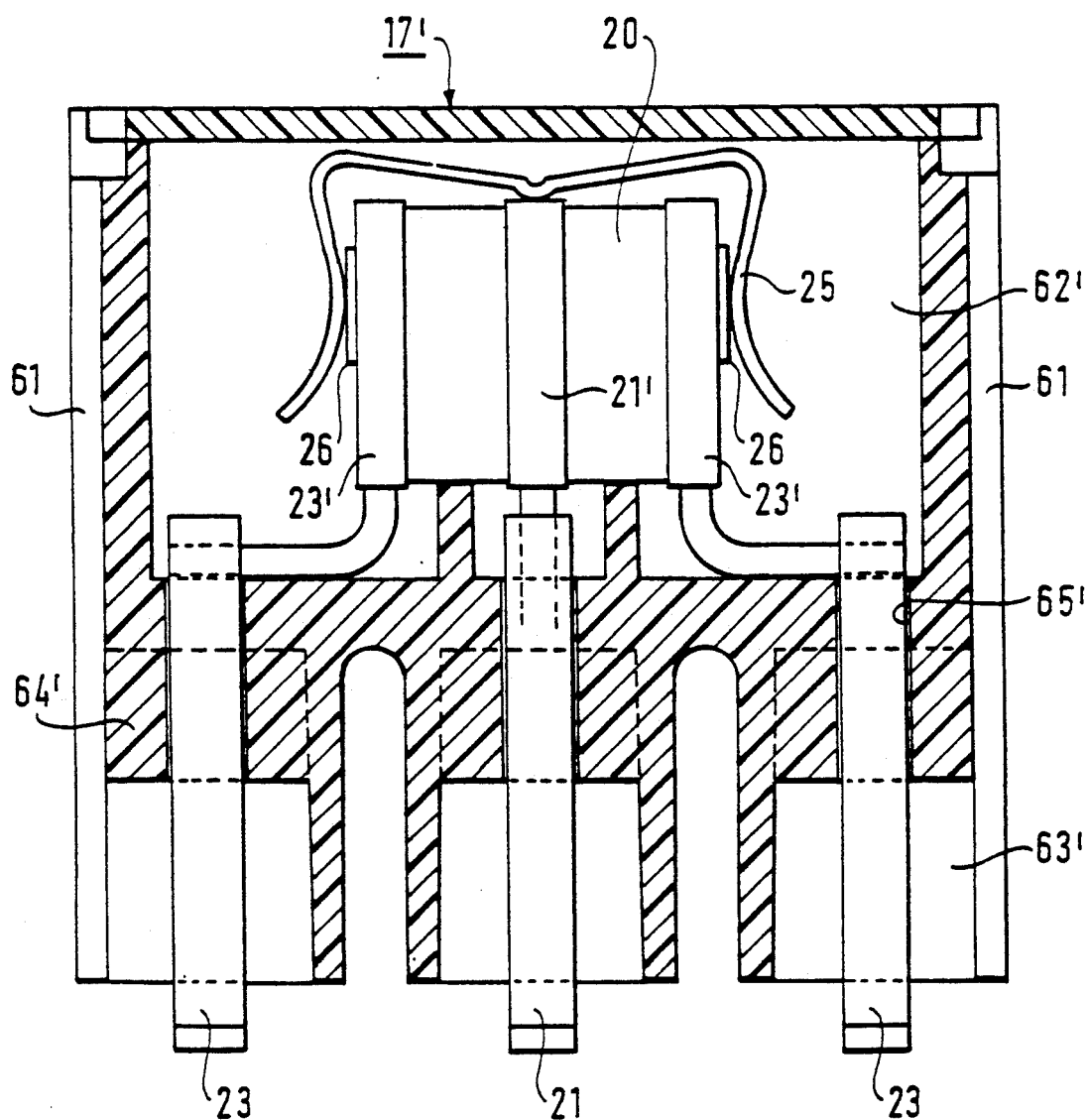
FIG. 17 is a cross-section through a variant of the above-mentioned box in which a lightning arrester is mounted.

The lightning arrester box 17' is described with reference to FIGS. 16 and 17. It is constituted by a block having a front housing 62' for the arrester 20 and three back housings or chimneys 63' in alignment for receiving respective ones of the line tabs 23 and the ground tab 21 of the arrester. These housings 62' and 63' are separated by an inside web 64' having passages 65' for the three contact tabs.

The front housing 62' which is initially opened to the side opposite to the web 64' is closed by a plate (no reference numeral) applied to its opening. The three back chimneys are all open.

The box has two semicircular grooves 61 in respective end faces that engage the circular half-ribs 47 that project into each compartment 44'. An outer shoulder 66' on the large side faces come into abutment with the edges of the longitudinal walls of each compartment 44'. The box is locked in a compartment by means of a screw 57 whose head comes into abutment against the end of the rib 47 and on the adjacent portion of the box 17', and whose opposite end engages the bottom edges of two adjacent chimneys 63'.

The three chimneys 63' engage in respective ones of the chimneys in the central row of the block.

In a variant that is not shown, the central chimneys 3 may be divided up their entire height into three independent chimneys for the two lateral tags 13 and the ground tag 11, into which is individually engaged in a corresponding one of the chimneys 63'.

In another variant that is not shown, the three independent chimneys 63' may be replaced by a single chimney that is fitted over the corresponding chimney 3 of the tag block.

The present invention is described with reference to the embodiments shown and to suggested variants thereof. Naturally, other modifications to the connection strip will occur to the person skilled in the art without altering the protection functions which are integrated in the above-described way in the strip, but for selected lines only. In particular, the chimneys 3 need not constitute the middle row as described above but could constitute one of the two side rows, with one of the side rows then becoming the middle row. In such a variant, independently of the dispositions relating to the three rows of chimneys on the front face of the block, the chimneys continue to be fitted as described above. It should merely be observed that in this variant, the dispositions relating to the three branches of the tag component 10 (FIG. 5) or 10' (FIG. 8) need to be modified accordingly.

We claim:

1. A connection strip having semi-integrated lightning arresters for transmission lines defined by pairs of incoming conductors connected to pairs of outgoing conductors, said connection strip comprising:

a insulative tag block (1) having a front face and a back face, a first row of tags (12) attributed to said incoming conductors (15), a second row of tags (14) attributed to said outgoing conductors (6) and a third row of protection and ground tags (13, 11) attributed to said lightning arresters (20), said tags (12, 14, 13, 11) of said first, second and third rows being mounted in said block and accessible from said front face of said block, each tag (12) of said first row being connected inside said block to a corresponding one (14) of said second and to a corresponding one of said protection tags (13) of said third row, and said ground tags (11) being distributed into said third row and being additionally mounted in said block proximate to said back face of said tag block and being connected to a common ground distributing means (8) at said tag block back face, and a protection strip (7) having a back face plug-fitted to the front face of the block in the third row of protection and ground tags (13, 11), said protection strip carrying individual lightning arresters (20) for said transmission lines and comprising a fourth row of line tabs (23) and ground tabs (21) on said back face of said protection strip and being respectively connected, inside said protection strip, to protection-line electrodes (23') and a ground electrode (21') of the lightning arresters of said protection strip, and wherein said protection strip comprises a charger of substantially the same length as said tag block in the long direction of said rows, said protection strip including a series of transverse partitions defining a series of compartments for receiving said lightning arresters, and retaining means for said lightning arresters mounted along the length of one of front faces of the charger and of the resulting strip, said compartments having respective bottoms opposite to the front face of said charger and of said strip and constituting said back face of the protection strip.

2. A strip according to claim 1, wherein said retaining means comprise a lid mounted on the front face of said charger and closing the fronts of said compartments.

3. A strip according to claim 2, wherein the longitudinal edges on the front face of said charger constitute a pair of slideways receiving said lid.

4. A strip according to claim 3, wherein the slideways are channel section slideways with crenelated outer flanges comprising alternating notches and teeth, and said lid comprising longitudinal edges with projecting teeth complementary to said notches of the slideways, to permit limited stroke use of said lid on said charger when installing or removing said lightning arresters.

5. A strip according to claim 4, wherein said limited stroke is of a length shorter than the length of one of the compartments.

6. A strip according to claim 2, wherein said lid has a transverse groove at one of the ends of an inside face thereof when the lid is on said charger, and the charger has a complementary rib on one of the ends of the charger front face.

7. A strip according to claim 6, wherein said lid further includes a recess in the inside face of the charger, almost adjacent to said transverse groove and defining therebetween a bulge constituting an obstacle to sliding off of the 8. A strip according to claim 1, wherein said retaining means comprise a quarter-turn screw received in said front face of the charger in said transverse partitions and holding each lightning arrester on the front edges and on the bottom of the corresponding compartment.

9. A strip according to claim 1, wherein said lightning arresters are mounted in individual protection boxes, with each lightning arrester being enclosed thereby, with only the contact tabs of the lightning arrester being accessible, said contact tabs of each arrester being connected inside the box to the line electrodes and the ground electrode of said each arrester and forming the fourth row of tags when the arrester in said box is mounted and retained in said charger.

10. A strip according to claim 9, wherein said box includes an inside web internally defining on opposite sides thereof a closed first housing for said arrester, and an open second housing which opens away from said web for housing said contact tabs of said arrester, and said housings intercommunicating via slots through the web.

11. A strip according to claim 10, wherein said second housings are subdivided into individual housings for each of said contact tabs.

12. A strip according to claim 10, wherein said box has outer shoulders substantially level with said web and constituting positioning abutments for positioning the arrester in the box within one of the compartments of said charger.

13. A strip according to claim 10, wherein said box is constituted by two identical molded half-shells assembled face to face.

14. A strip according to claim 13, wherein the two half-shells include mutual centering means.

15. A strip according to claim 1, wherein said tag block has three rows of chimneys projecting from said front face and respectively receiving respective tags of said first, second, and third rows of tags, and the three rows of chimneys constituting respectively, first, second, and third rows of chimneys.

16. A strip according to claim 15, wherein said lightning arresters are of three-pole type, each having two of said line tabs on either side of a third ground tab, and each chimney of the third row of chimneys has three internal channels over at least a portion of the chimney height, for receiving three successive tags of said third row, said line tags being received in two of said channels, and a ground tag being received in the third channel between the two line tags.

17. A strip according to claim 16, wherein the tags in corresponding positions in the first and second rows of tags, and one of the line tags of said third row are directly interconnected by a connection bridge and together form a tag component, and said connection bridge extends transversely over the back face of said tag block.

18. A strip according to claim 17, wherein said ground tag in each chimney of the third row of chimneys has a connection tail projecting from the back face of said tag block and in friction contact with a support rail constituting said common ground distributing means.

19. A strip according to claim 18, wherein said ground tag and said line tags in each chimney of the third row of chimneys, each comprise two resilient branches having respective bulges projecting from their facing edges towards each other and being offset from one another along said edges.

20. A strip according to claim 15, wherein each chimney of the third row of chimneys has a common opening for end portions of the tags individually connected to corresponding tags of the fourth row of tags, together with sealing and insulation means mounted in said common opening.

21. A strip according to claim 20, wherein said sealing and insulation means are constituted by a plastic cap having cells.

22. A strip according to claim 20, wherein said sealing and insulation means are constituted by an insulating grease.

23. A strip according to claim 16, wherein a retaining plate retains the tags in said chimneys, and the retaining plate is fixed and sealed on said back face of the tag block.

24. A strip according to claim 15, wherein said tag block includes two additional chimneys on said front face, one at each of the two ends of the third row of chimneys, and wherein said protection strip is fitted with two assembly tabs formed on the ends of said charger and projecting from the back face of said protection strip and received in the additional chimney.

25. A connection strip having semi-integrated lightning arresters for transmission lines defined by pairs of incoming conductors connected to pairs of outgoing conductors, said connection strip comprising:

a insulative tag block (1) having a front face and a back face, a first row of tags (12) attributed to said incoming conductors (15), a second row of tags (14) attributed to said outgoing conductors (6) and a third row of protection and ground tags (13, 11) attributed to said lightning arresters (20), said tags (12, 14, 13, 11) of said first, second and third rows being mounted in said block and accessible from said front face of said block, each tag (12) of said first row being connected inside said block to a corresponding one (14) of said second and to a corresponding one of said protection tags (13) of said third row, and said ground tags (11) being distributed into said third row and being additionally mounted in said block proximate to the back face of said tag block and being connected to a common ground distributing means (8) at said back face, and a protection strip (7) having a back face plug-fitted to the front face of the block in the third row of protection and ground tags (13, 11), said protection strip carrying individual lightning arresters (20) for said transmission lines and comprising a fourth row of line tabs (23) and ground tabs (21) on said back face of said protection strip and being respectively connected, inside said protection strip, to protection-line electrodes (23') and a ground electrode (21') of the lightning arresters of said protection strip.

26. A strip according to claim 25, further including retaining tabs formed on said tag block and projecting from said back face thereof, said retaining tabs having respective lateral projections and respective back end catches, and wherein windows are formed in said lateral projections.

27. A strip according to claim 25, wherein said third row of tags is situated between said first and second rows of tags and is substantially centered therebetween, said rows of chimneys are separated by two grooves in the front face of said tag block.

28. A strip according to claim 25, wherein said third row of tags is to one side of said first and second rows of tags and is a side row, and said rows of chimneys are separated by two grooves in the front face of said tag block.

* * * * *